(12) United States Patent
Hwang

(10) Patent No.: US 9,148,008 B2
(45) Date of Patent: Sep. 29, 2015

(54) OVER CURRENT PROTECTION APPARATUS

(75) Inventor: Kyu Min Hwang, Gwangju (KR)

(73) Assignee: Green Powerset Co., LTD., Seoul (KR)

( * ) Notice: Subject to any disclaimer, the term of this patent is extended or adjusted under 35 U.S.C. 154(b) by 185 days.

(21) Appl. No.: 13/593,860

(22) Filed: Aug. 24, 2012

(65) Prior Publication Data

US 2013/0222960 A1    Aug. 29, 2013

(30) Foreign Application Priority Data

Aug. 24, 2011 (KR) .................. 10-2011-0084501
Aug. 26, 2011 (KR) .................. 10-2011-0086003

(51) Int. Cl.
*H02H 3/00* (2006.01)
*H02H 3/08* (2006.01)
*H02H 3/087* (2006.01)
*H02H 9/02* (2006.01)
*H02H 3/093* (2006.01)

(52) U.S. Cl.
CPC ............... *H02H 3/08* (2013.01); *H02H 3/081* (2013.01); *H02H 3/087* (2013.01); *H02H 3/093* (2013.01); *H02H 9/02* (2013.01)

(58) Field of Classification Search
USPC .................. 361/93.7–93.9, 86–87
See application file for complete search history.

(56) References Cited

U.S. PATENT DOCUMENTS

| | | | | |
|---|---|---|---|---|
| 5,214,575 A | * | 5/1993 | Sugishima et al. | 363/37 |
| 5,457,591 A | * | 10/1995 | Mock et al. | 361/18 |
| 5,777,836 A | * | 7/1998 | Price et al. | 361/94 |
| 6,768,289 B2 | * | 7/2004 | Fujiwara | 320/134 |
| 7,057,529 B2 | * | 6/2006 | Bourgault | 340/907 |
| 8,493,022 B2 | * | 7/2013 | Bertness | 320/104 |
| 2008/0151444 A1 | * | 6/2008 | Upton | 361/31 |
| 2009/0201618 A1 | * | 8/2009 | Hasegawa et al. | 361/93.9 |

* cited by examiner

*Primary Examiner* — Danny Nguyen
(74) *Attorney, Agent, or Firm* — William Park & Associates Ltd.

(57) ABSTRACT

Provided is an over-current protection apparatus including a current sensor configured to transform input current into a voltage signal, and output the voltage signal; an over-current sensing unit driven according to the voltage signal output from the current sensor; and an over-current determination unit configured to generate a switching unit driving signal, the logic level of which is determined according to a duration of an output signal of the over-current sensing unit.

20 Claims, 3 Drawing Sheets

OVER CURRENT PROTECTION APPARATUS

BACKGROUND

1. Field of the Invention

The present invention relates to an electric system protection apparatus, and more particularly, to an over-current protection apparatus.

2. Discussion of Related Art

In general, a switching mode power supply employing pulse width modulation (PWM) is a device that transforms an input direct current (DC) voltage into a voltage having a square wave shape using a semiconductor device, e.g., a power metal-oxide-semiconductor field effect transistor (MOSFET), as a switch, and then obtains a controlled DC output voltage using a filter. The switching mode power supply controls the flow of current by using a switching processor of the semiconductor device, and is thus a high-efficient, high-durable, compact, and light device compared to a conventional linear type power supply.

When over-current is sensed, the switching mode power supply may perform any of various control methods, e.g., control current not to continuously increase at an output side thereof, reduce an amount of current supplied, or increase the amount of current supplied.

However, in the case of a switching mode power supply employing a constant-current supply method, a current-mode method, a voltage-mode method, a sequential oscillation method, or the like, even if over-current is sensed, output current continuously flows when the over-current is continuously maintained.

When the over-current continuously flows, unnecessary power may be supplied, or a switching device or other components may be maintained to be heated and thus be damaged. Thus, fire may occur, a circuit or equipment may be damaged, and a system may be difficult to operate normally.

PRIOR ART DOCUMENTS

Patent Documents (Patent Document 1) Korean Patent Application Laid-Open No. 10-2008-0099417

(Patent Document 2) Korean Patent Application Laid-Open No. 20-0321222

SUMMARY OF THE INVENTION

The present invention is directed to an over-current protection apparatus capable of blocking the flow of over-current that may cause a system error as soon as the over-current is sensed.

According to an aspect of the present invention, there is provided an over-current protection apparatus including a current sensor configured to transform input current into a voltage signal, and output the voltage signal; an over-current sensing unit driven according to the voltage signal output from the current sensor; and an over-current determination unit configured to generate a switching unit driving signal, the logic level of which is determined according to a duration of an output signal of the over-current sensing unit.

According to another aspect of the present invention, there is provided a over-current protection apparatus including a current sensor configured to transform input current into a voltage signal, and output the voltage signal; and a plurality of over-current control circuits connected in parallel between a switching unit, which is connected to a current supply line of a target device to be protected, and the current sensor.

According to still another aspect of the present invention, there is provided an over-current protection apparatus including a current sensor configured to transform input current into a voltage signal, and output the voltage signal; a first over-current control circuit configured to control a first switching unit by detecting whether over-current is generated in a forward current path of the current sensor; and a second over-current control circuit configured to control a second switching unit by detecting whether over-current is generated in a backward current path of the current sensor.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
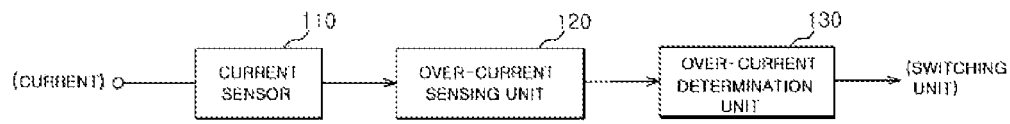
FIG. 1 is a block diagram of an over-current protection apparatus according to an exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. Like reference numerals denote like elements throughout the drawings.

FIG. 1 is a block diagram of an over-current protection apparatus 10 according to an exemplary embodiment of the present invention.

Referring to FIG. 1, the over-current protection apparatus 10 includes a current sensor 110 that transforms input current into a voltage signal, and outputs the voltage signal, an over-current sensing unit 120 that is driven according to the voltage signal output from the current sensor 110, and an over-current determination unit 130 that determines whether over-current occurs, in response to an output signal of the over-current sensing unit 120 when the over-current sensing unit 120 is driven.

The output signal of the over-current determination unit 130 controls a switching unit connected to a current supply line of a system that is to be protected so as to determine whether the switching unit is to be on or off.

The current sensor 110 senses an amount of current flowing through a device that is to be protected, e.g., a power supply system, and transforms the current into a voltage. The current sensor 110 may be selected from the group consisting of a hall sensor, a current transformer, and a resistor. In particular, when the hall sensor is selected as the current sensor s110, over-current may be detected bi-directionally, as will be described in detail below.

The over-current sensing unit 120 may be embodied as a switching device that is determined to be driven or not driven according to the voltage signal that is an output signal of the current sensor 110. An optical switching device may be preferably selected as the over-current sensing unit 120. In the optical switching device that generally includes a photo diode and an electronic switch, a signal is transmitted/received only in the form of light between an input terminal and an output terminal. Thus, the optical switching device may have an optically insulated state. Accordingly, an internal device may be more efficiently protected.

The over-current determination unit 130 determines over-current that is maintained to be shorter than a predetermined time, as a transient pulse signal, and determines over-current that is maintained for the predetermined time or more, as over-current to be blocked, in response to the output signal of the over-current sensing unit 120. When over-current that is to be blocked is sensed, the over-current determination unit 130 turns off the switching unit.

In other words, the switching unit is 'on' when over-current is not sensed, or over-current considered as a transient pulse signal is sensed, and is 'off' to cut off power to a device that is to be protected when over-current that is to be blocked is sensed.

Figure 2:
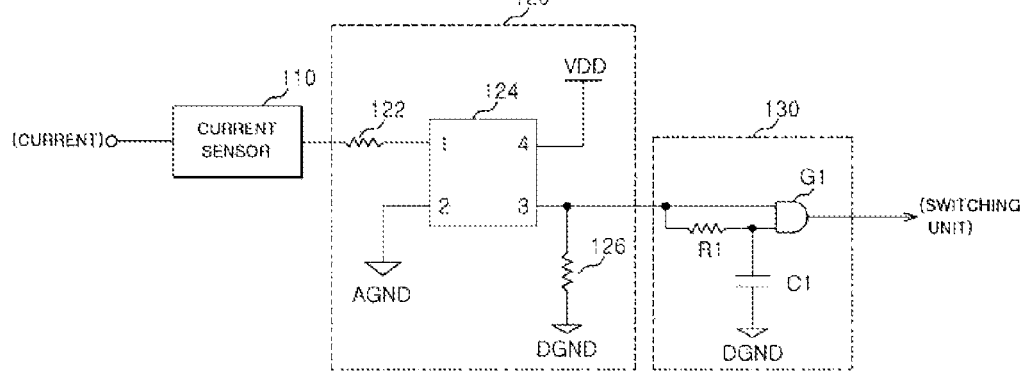
FIG. 2 is a circuit diagram of the over-current protection apparatus of FIG. 1.

FIG. 2 is a circuit diagram of the over-current protection apparatus 10 of FIG. 1.

Referring to FIG. 2, the over-current sensing unit 120 includes a current-amount control unit 122, an optical switching device 124, and a pull-down unit 126.

First, the current-amount control unit 122 may be configured, for example, using a resistor, and determines a reference value for detecting over-current by controlling an amount of current to be supplied to the optical switching device 124 based on an output voltage of the current sensor 110.

The optical switching device 124 may be configured using a photo coupler or a photo metal-oxide semiconductor (MOS). By using the optical switching device 124, a current path may be prevented from being formed between power sources having different grounded states. In other words, since a signal is transmitted/received only in the form of light between an input terminal and an output terminal of the optical switching device 124, current does not flow between the input and output terminals. Accordingly, an internal device may be more securely protected by optically insulating.

Figure 3:
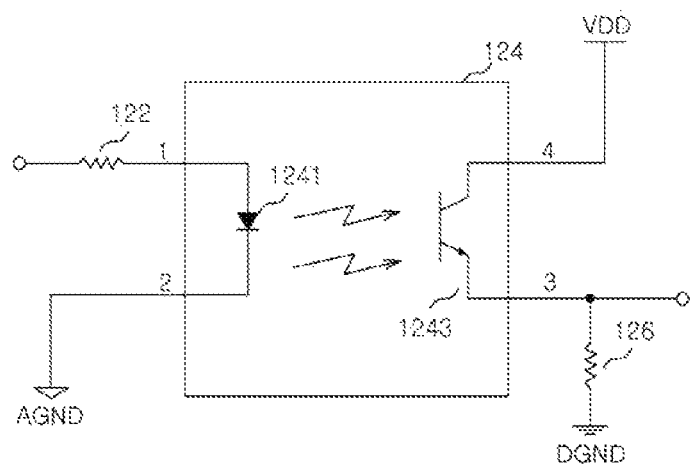
FIG. 3 is a circuit diagram of an optical switching device according to an exemplary embodiment of the present invention.
Figure 4:
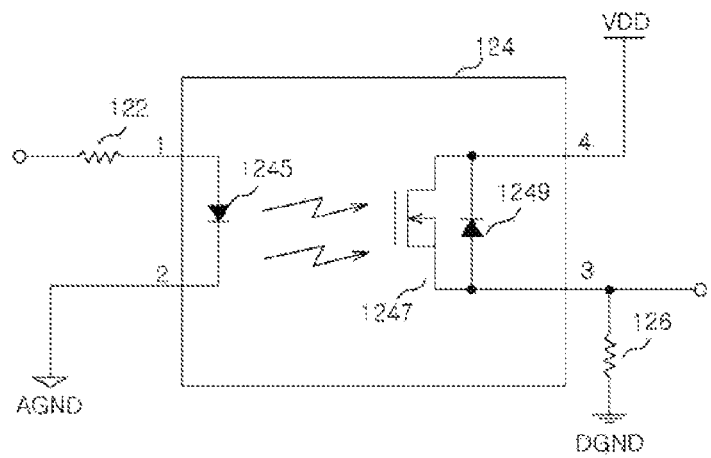
FIG. 4 is a circuit diagram of an optical switching device according to another exemplary embodiment of the present invention.

FIG. 3 is a circuit diagram of the optical switching device 124, e.g., a photo coupler, according to an exemplary embodiment of the present invention. FIG. 4 is a circuit diagram of the optical switching device 124, e.g., a photo MOS, according to another exemplary embodiment of the present invention.

Referring to FIG. 3 (or 4), the optical switching device 124 includes a light-emitting device 1241 (or 1245) that forms a current path between an input terminal (first terminal) and a first ground terminal AGND (second terminal) in response to an input signal, the voltage of which is determined by the current-amount control unit 122; and a light-receiving unit 1243 (or 1247) that is driven to form a current path between a first power supply voltage terminal VDD (fourth terminal) and an output terminal (third terminal) when an amount of current flowing through the light-emitting device 1241 (or 1245) is equal to or greater than a predetermined level.

The pull-down unit 126 is disposed between the output terminal (third terminal) and a second ground terminal DGND of the optical switching device 124, and allows an output signal to be rapidly output.

When an amount of current supplied to the optical switching device 124, which is controlled by the current-amount control unit 122 connected to the input terminal (first terminal), is equal to or greater than a predetermined level, the fourth terminal and the third terminal are electrically connected to output an over-current detection signal via the third terminal.

Although FIGS. 2 to 4 each illustrate the pull-down unit 126, the present invention is not limited thereto, and a pull-up unit may be disposed between the first power supply voltage terminal DVDD and the fourth terminal.

Furthermore, the optical switching device 124 that is a photo MOS type illustrated in FIG. 4 may further include a switching device 1249 that electrically connects the first power supply voltage terminal VDD (fourth terminal) and the output terminal (third terminal) to the light-receiving unit 1247.

The optical switching devices 124 illustrated in FIGS. 3 and 4 are just illustrative and the present invention is thus not limited thereto.

Referring back to FIG. 2, the over-current determination unit 130 outputs a switching unit driving signal according to a duration of a signal output from the over-current sensing unit 120.

To this end, the over-current determination unit 130 includes a logic device G1 that receives a signal output from the output terminal (third terminal) of the over-current sensing unit 120, as a first input signal; and delayer circuits R1 and C1 that delay the output signal of the over-current sensing unit 120 for a predetermined time, and then supply the delayed output signal as a second input signal to a logic device G2. The delayer circuits R1 and C1 may include a resistor R1 and a capacitor C1. Also, a time constant of the resistor R1 and the capacitor C1 may be used. Specifically, when over-current that is maintained for a time period that is less than the time constant, is detected, the over-current may be considered as a transient pulse signal, and the switching unit is controlled to not be 'off'. When over-current that is maintained for a time period that is equal to or greater than the time constant is detected, the switching unit driving signal is output to control the switching unit to be 'off'.

Thus, in the over-current protection apparatus 10 illustrated in FIG. 2, if an amount of current flowing through a device that is to be protected, e.g., a power supply system, is detected by and output in the form of a voltage signal from the current sensor 110, then the optical switching device 124 of the over-current sensing unit 120 is driven according to the detected voltage signal. A signal output from the optical switching device 124 when the optical switching device 124 is driven, is supplied to the over-current determination unit 130. When over-current is maintained for a predetermined time or more, the over-current determination unit 130 turns off the switching unit to prevent the over-current from flowing through a device that is to be protected.

The over-current sensing unit 120 and the over-current determination unit 130 that determine whether the switching unit is to be 'on' or 'off' according to an output signal of the current sensor 110, may be referred to together as an over-current control circuit.

Although cases in which over-current is blocked using the over-current sensing unit 120 and the over-current determination unit 130 separately have been described above, at least two over-current sensing units 120 and at least two over-current determination units 130 may be connected between the current sensor 110 and the switching unit, as will be described below.

Figure 5:
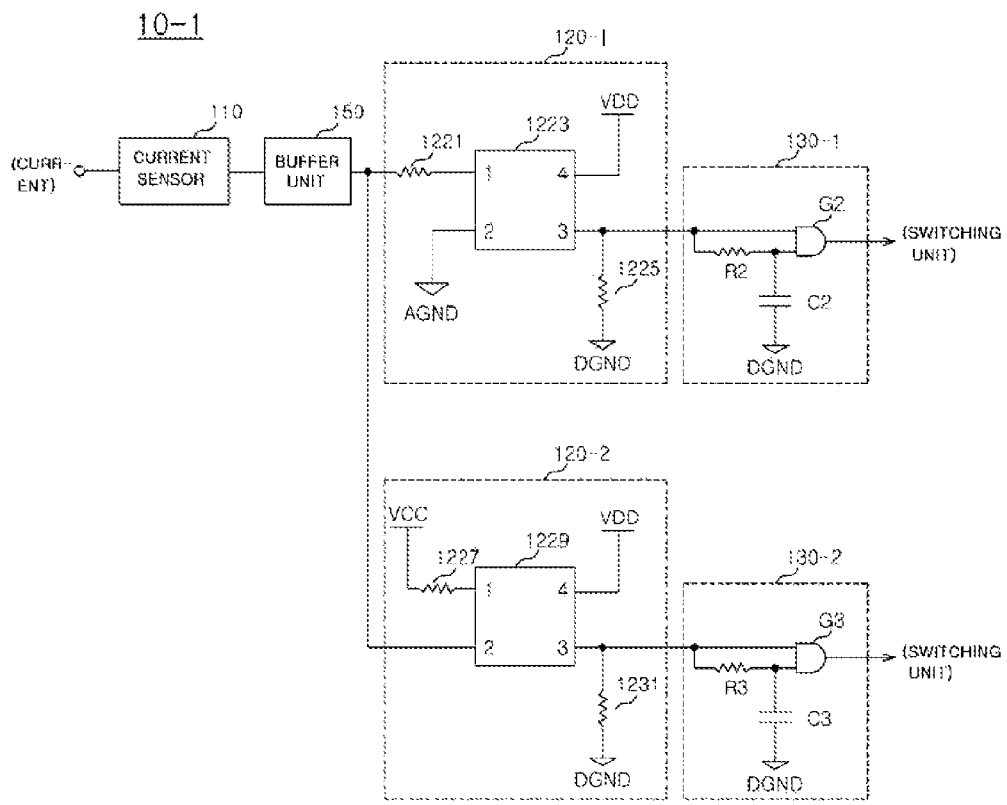
FIG. 5 is a circuit diagram of an over-current protection apparatus according to another exemplary embodiment of the present invention.

FIG. 5 is a circuit diagram of an over-current protection apparatus 10-1 according to another exemplary embodiment of the present invention.

The over-current protection apparatus 10-1 illustrated in FIG. 5 includes first over-current control circuits 120-1 and 130-1 and second over-current control circuits 120-2 and 130-2 that are connected in parallel between a current sensor 110 and a switching unit.

A current-amount control unit 1221 included in the first over-current control circuits 120-1 and 130-1, and a current-amount control unit 1227 included in the second over-current control circuits 120-2 and 130-2 may each be embodied as a resistor. The current-amount control units 1221 and 1227 may be the same or different in terms of their sizes. When resistors having different sizes are employed as the current-amount control units 1221 and 1227, respectively, the over-current protection apparatus 10-1 is capable of detecting over-currents having various levels.

When the plurality of the over-current control circuits 120-1 and 130-1 and 120-2 and 130-2 are connected as described above, an amount of current output from the current sensor 110 may decrease. In this case, optical switching devices 1223 and 1229 may not operate or may malfunction as an output voltage of the current sensor 110 decreases. Thus, a buffer unit 150, and preferably, an analog buffer unit may be additionally connected to an output terminal of the current sensor 110, thereby maintaining an amount of current output from the current sensor 110 at a desired level or more.

In FIG. 5, reference numerals 1225 and 1231 denote pull-down units, reference numerals R2 and R3 denote resistors, reference numerals C2 and C3 denote capacitors, and reference numerals G2 and G3 denote logic devices. Functions of these elements are similar to or the same as those of the over-current sensing unit 120 and the over-current determination unit 130 illustrated in FIG. 2, and thus are not described again here.

As described above, an over-current protection apparatus according to an exemplary embodiment of the present invention may employ a hall sensor as the current sensor 110.

The hall sensor is a current sensor having a high response rate, which transforms the intensity of a current magnetic field into a voltage. That is, the hall sensor is a sensor using a hall element having a current magnetic effect in that an output varies when a magnetic field is applied in a direction perpendicular to a direction of current. Since an output signal of the hall sensor is an analog signal, the hall sensor may be directly used in a system without a conversion process, and is a highly durable, compact, and economical sensor.

In particular, if a reference voltage is applied to the hall sensor, current flows in a forward direction with respect to the reference voltage, and the more (an amount of) current, the higher an output voltage, then a voltage may decrease in a backward direction with respect to the reference voltage. Thus, an over-current control circuit (over-current sensing unit and over-current control unit) may be applied in both the forward direction and the backward direction.

Both an over-discharging problem and an over-charging problem have arisen as important issues in the field of power supply systems using a secondary battery module that has drawn attention as a next-generation fuel to provide a solution to environmental pollution. Thus, by configuring an over-current protection apparatus using the hall sensor, both over-discharging and over-charging may be detected bi-directionally according to the flow of current in the secondary battery module.

Figure 6:
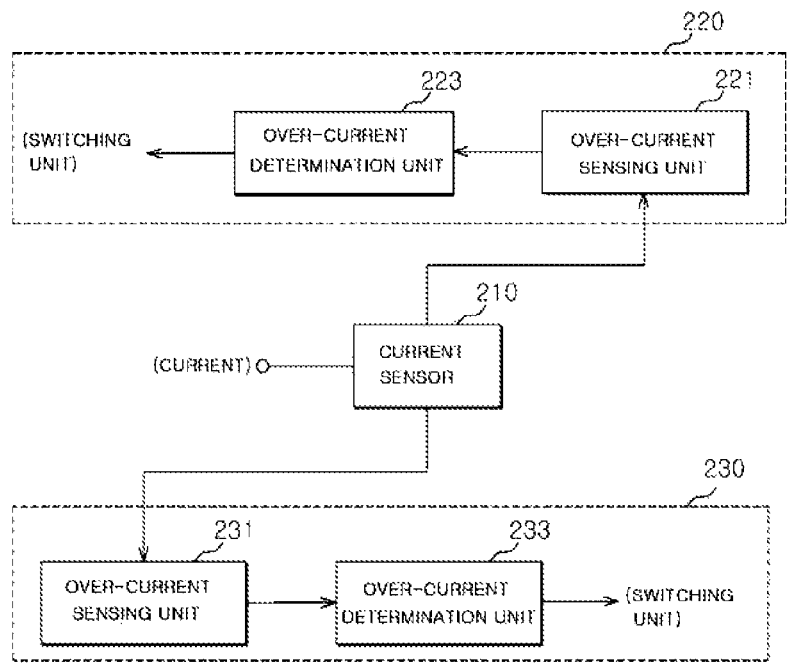
FIG. 6 is a block diagram of an over-current protection apparatus according to another exemplary embodiment of the present invention.

FIG. 6 is a block diagram of an over-current protection apparatus 20 according to another exemplary embodiment of the present invention.

Referring to FIG. 6, the over-current protection apparatus 20 includes a current sensor 210, a first over-current control circuit 220, and a second over-current control circuit 230.

The first over-current control circuit 220 includes an over-current sensing unit 221 and an over-current determination unit 223. The second over-current control circuit 230 includes an over-current sensing unit 231 and an over-current determination unit 233. Structures of the first and second over-current control circuits 220 and 230 may be substantially the same as those of circuits as illustrated in FIGS. 2 to 5, or those of circuits or devices similar thereto.

The current sensor 210 may be embodied as a hall sensor, and transforms an amount of current flowing through a device, which is to be protected, into a voltage signal, and supplies the voltage signal to the first over-current control circuit 220. If it is assumed that a direction in which current flows from the current sensor 210 to the first over-current control circuit 220 is a forward direction, when a large amount of current flows in the forward direction and an output voltage of the current sensor 210 becomes high, a voltage applied in a backward direction, i.e., a voltage applied to the second over-current control circuit 230, is lowered.

When a voltage in a forward-direction path is lowered, a voltage in a backward-direction path is increased.

Thus, over-current flowing in the forward-direction path is detected by the first over-current control circuit 220 to control a switching unit, and over-current flowing in the backward direction is detected by the second over-current control circuit 230 to control the switching unit.

In other words, over-current may be bi-directionally detected in a device that is to be protected, e.g., a power supply system.

Figure 7:
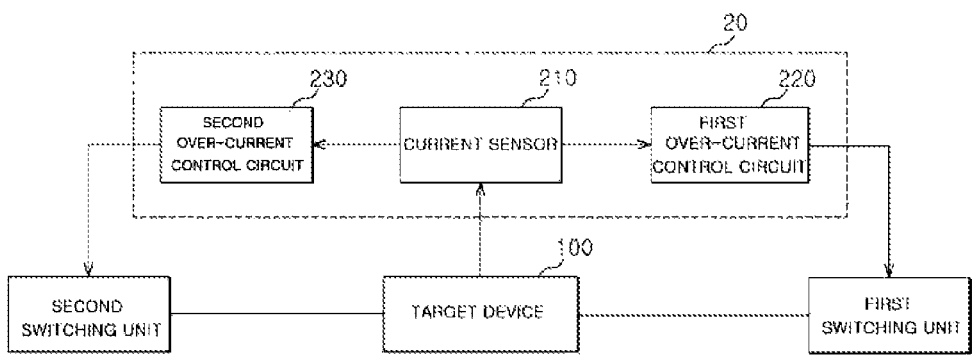
FIG. 7 is a block diagram illustrating an example of a case in which the over-current protection apparatus of FIG. 6 is applied.

FIG. 7 is a block diagram illustrating an example of a case in which the over-current protection apparatus of FIG. 6 is applied.

In FIG. 7, a target device 100 that is to be protected may be a power supply system including a fuel battery module, e.g., a secondary battery module. The target device 100 is connected between a power supply unit (not shown) and an external device (not shown) such that the target device 100 is charged with power supplied from the power supply unit, and supplies the charged power to the external device to electrically operate the external device.

When the over-current protection apparatus 20 of FIG. 6 is applied to such a power supply system, whether the power supply system is over-charged may be determined, for example, by the first over-current control circuit 220, and over-current may be prevented from flowing through the power supply system by using the secondary battery module. Similarly, whether the power supply system is over-discharged may be detected by the second over-current control circuit 230, and over-current may be prevented from flowing through an external device that is supplied power by using the secondary battery module.

According to the above embodiments of the present invention, the flow of current may be blocked as soon as over-current is sensed, thereby efficiently protecting a target device.

When a hall sensor is used to sense current, an amount of current may be bi-directionally sensed using a voltage of an output terminal of the hall sensor. Thus, when the present invention is applied to a power supply system using a charge/discharge element, such as a secondary battery, over-charging and over-discharging may be simultaneously detected.

Also, according to the present invention, an optical switching device may be used to sense over-current. In the optical switching device, signals are received/transmitted only in the form of light between an input terminal and an output terminal. Thus, since current does not flow between the input terminal and the output terminal, the optical switching device may have an optically insulated state. Accordingly, an internal device may be more efficiently protected.

Furthermore, when a plurality of optical switching devices connected in parallel are used as an over-current sensing unit, and an amount of current supplied is controlled at an input terminal of each of the plurality of optical switching devices, an amount of over-current that is to be detected may be arbitrarily determined by a user, and not only fatal over-current but also warning over-current may be detected.

It will be apparent to those skilled in the art that various modifications can be made to the above-described exemplary embodiments of the present invention without departing from the spirit or scope of the invention. The exemplary embodiments should be considered in descriptive sense only and not for purposes of limitation. Therefore, the scope of the invention is defined not by the detailed description of the invention but by the appended claims, and it is intended that the present invention covers all such modifications provided they come within the scope of the appended claims and their equivalents.

What is claimed is:

1. An over-current protection apparatus comprising:
    a current sensor configured to transform input current into a voltage signal, and output the voltage signal;
    an over-current sensing unit driven according to the voltage signal output from the current sensor; and
    an over-current determination unit configured to generate a switching unit driving signal, the logic level of which is determined according to a duration of an output signal of the over-current sensing unit,
    wherein the over-current determination unit includes:
        a logic device configured to receive a signal output via an output terminal of the over-current sensing unit, as a first input signal; and
        a delayer circuit configured to delay the output signal of the over-current sensing unit for a predetermined time, and provide the delayed output signal as a second input signal to be supplied to the logic device.

2. The over-current protection apparatus of claim 1, wherein the current sensor is one of a hall sensor, a current transformer, and a resistor.

3. The over-current protection apparatus of claim 1, wherein the over-current sensing unit comprises an optical switching device.

4. The over-current protection apparatus of claim 3, wherein the over-current sensing unit comprises:
    a current-amount control unit configured to determine an amount of current to be supplied to the optical switching device according to the voltage signal output from the current sensor;
    an optical switching device driven in response to the voltage signal, the level of which is controlled by the current-amount control unit; and
    a pull-down unit connected between an output terminal and an input terminal of the optical switching device.

5. The over-current protection apparatus of claim 4, wherein the optical switching device is a photo coupler.

6. The over-current protection apparatus of claim 4, wherein the switching device is a photo metal-oxide-semiconductor (MOS).

7. The over-current protection apparatus of claim 4, wherein the current-amount control unit comprises a resistor.

8. The over-current protection apparatus of claim 1, wherein, when the output signal of the over-current sensing unit is maintained for a predetermined time or more, the over-current determination unit outputs the switching unit driving signal for turning off a switching unit.

9. An over-current protection apparatus comprising:
    a current sensor configured to transform input current into a voltage signal, and output the voltage signal;
    a first over-current control circuit connected between a first switching unit and the current sensor; and
    a second over-current control circuit connected between a second switching unit and the current sensor;
    wherein each of the first and the second over-current control circuits comprises an over-current sensing unit driven according to the voltage signal output from the current sensor and an over-current determination unit configured to generate a switching unit driving signal, the logic level of which is determined according to a duration of an output signal of the over-current sensing unit,
    wherein each over-current determination unit includes a logic device that directly receives a signal output from the output terminal of its corresponding over-current sensing unit.

10. The over-current protection apparatus of claim 9, wherein
    wherein each over-current determination unit comprises:
    the logic device configured to receive the signal output via the output terminal of its corresponding over-current sensing unit, as a first input signal; and
    a delayer circuit configured to delay the output signal of the over-current sensing unit for a predetermined time, and provide the delayed output signal as a second input signal to be supplied to the logic device.

11. The over-current protection apparatus of claim 10, wherein the over-current sensing unit comprises an optical switching device.

12. The over-current protection apparatus of claim 10, wherein the over-current determination unit outputs the switching unit driving signal for turning off a switching unit when the output signal of the over-current sensing unit is maintained for a predetermined time or more.

13. The over-current protection apparatus of claim 9, wherein the current sensor is one of a hall sensor, a current transformer, and a resistor.

14. The over-current protection apparatus of claim 9, further comprising an analog buffer unit connected between the current sensor and the first and the second over-current control circuits.

15. An over-current protection apparatus comprising:
    a current sensor configured to transform input current into a voltage signal, and output the voltage signal;

a first over-current control circuit configured to control a first switching unit by detecting whether over-current is generated in a forward current path of the current sensor; and a second over-current control circuit configured to control a second switching unit by detecting whether over-current is generated in a backward current path of the current sensor, wherein each of the first and the second over-current control circuits comprises an over-current sensing unit driven according to the voltage signal output from the current sensor and an over-current determination unit configured to generate a switching unit driving signal, the logic level of which is determined according to a duration of an output signal of the over-current sensing unit, wherein each over-current determination unit includes:
   a logic device configured to receive a signal output via an output terminal of the over-current sensing unit, as a first input signal; and
   a delayer circuit configured to delay the output signal of the over-current sensing unit for a predetermined time, and provide the delayed output signal as a second input signal to be supplied to the logic device.

16. The over-current protection apparatus of claim 15, wherein the current sensor comprises a hall sensor.

17. The over-current protection apparatus of claim 15, wherein the over-current sensing unit comprises an optical switching device.

18. The over-current protection apparatus of claim 15, wherein, when the output signal of the over-current sensing unit is maintained for a predetermined time or more, the over-current determination unit outputs the switching unit driving signal for turning off the first and second switching unit.

19. The over-current protection apparatus of claim 15, wherein the current sensor receives current flowing through a fuel battery module, transforms the current into a voltage signal, and outputs the voltage signal,
   the first over-current control circuit detects over-current flowing via a charging path of the fuel battery module, and
   the second over-current control circuit detects over-current flowing via a discharging path of the fuel battery module.

20. The over-current protection apparatus of claim 19, wherein the fuel battery module comprises a secondary battery module.

* * * * *